(12) United States Patent
Seo

(10) Patent No.: US 12,501,119 B2
(45) Date of Patent: Dec. 16, 2025

(54) ROBUST HOLOGRAM WATERMARKING SYSTEM BASED ON ARTIFICIAL INTELLIGENCE

(71) Applicant: Kwangwoon University Industry—Academic Collaboration Foundation, Seoul (KR)

(72) Inventor: Young Ho Seo, Seoul (KR)

(73) Assignee: Kwangwoon University Industry-Academic Collaboration Foundation, Seoul (KR)

( * ) Notice: Subject to any disclaimer, the term of this patent is extended or adjusted under 35 U.S.C. 154(b) by 440 days.

(21) Appl. No.: 18/148,496

(22) Filed: Dec. 30, 2022

(65) Prior Publication Data
US 2024/0214648 A1    Jun. 27, 2024

(30) Foreign Application Priority Data
Dec. 22, 2022   (KR) .......................... 10-2022-0181518

(51) Int. Cl.
*H04N 21/8358*   (2011.01)

(52) U.S. Cl.
CPC ............................... *H04N 21/8358* (2013.01)

(58) Field of Classification Search
CPC .... H04N 21/8358; G03H 1/0011; G06N 3/08; G06T 1/005
See application file for complete search history.

(56) References Cited

U.S. PATENT DOCUMENTS

| | | | |
|---|---|---|---|
| 7,630,511 B2 * | 12/2009 | Zhao ....................... | G06T 1/005 380/200 |
| 2002/0157005 A1 * | 10/2002 | Brunk ................... | G06T 1/0071 713/176 |
| 2017/0090418 A1 * | 3/2017 | Tsang .................. | G03H 1/0011 |

FOREIGN PATENT DOCUMENTS

| | | |
|---|---|---|
| KR | 10-1094811 B1 | 12/2011 |
| KR | 10-1588858 B1 | 1/2016 |
| KR | 10-1980886 B1 | 5/2019 |
| KR | 10-2062990 B1 | 1/2020 |
| KR | 10-2022-0165616 A | 12/2022 |

OTHER PUBLICATIONS

"Ji-Won Kang, Digital Hologram Watermarking Based on Multiple Deep Neural Networks Training Reconstruction and Attack, Jul. 2021, MDPI, 4D optical imaging sensor journal, pp. 1-18" (Year: 2021).*

(Continued)

*Primary Examiner* — Andrew W Bee
*Assistant Examiner* — D J Dhooge
(74) *Attorney, Agent, or Firm* — NKL LAW; Jae Youn Kim

(57) ABSTRACT

The present invention relates to a robust hologram watermarking system based on artificial intelligence, in which an attack simulation is added before an operation of a hologram resolution adjustment network so that training is performed to exhibit a feature that is more robust against an attack. A hologram is watermarked by using deep learning, and training is performed by adding an attack simulation in a training process and adding quality of a distance between a real part and an imaginary part in a complex space to a loss function, so that watermarking is more robust against an attack.

9 Claims, 10 Drawing Sheets

(56) References Cited

OTHER PUBLICATIONS

Stephen A. Benton and V. Michael Bove Jr., Holographic Imaging, A John Willy and Sons Inc., Hoboken, NJ, 2008.
J. Lee, J. Jeong, H. Cho, D. Yoo, B. Lee, and B. Lee, "Deep neural network for multi-depth hologram generation and ts training strategy," Optics Express, vol. 28, No. 18, pp. 27137-27154, Aug. 31, 2020.
J. Kang, J. Lee, Y. Lee, D. Kim, and Y. Seo, "Interference pattern generation by using deep learning based on GAN," ITC-CSCC, pp. 1-2, 2019.
The Joint Photographic Experts Group (JPEG) Pleno Home Page. Available online: https://jpeg.org/jpegpleno/holography.html.
I. A. Gus'kov, E. R. Muslimov, A. N. Mel'nikov, and A. R. Gil'fanov, "Design procedure for a holographic display considering the diffraction efficiency of a volume phase hologram," J. Opt. Technol. 87, 650-657 (2020).
Anar Khuderchuluun, Yan-Ling Piao, Munkh-Uchral Erdenebat, Erkhembaatar Dashdavaa, Moung Hee Lee, Seok-Hee Jeon, and Nam Kim, "Simplified digital content generation based on an inverse-directed propagation algorithm for holographic stereogram printing," Appl. Opt. 60, 4235-4244 (2021).
Kishk, S.; Javidi, B. 3D object watermarking by a 3D hidden object. Opt. Express 2003, 11, 874-888.
Kim, H.; Lee, Y.H. Optimal watermarking of digital hologram of 3-D object. Opt. Express 2005, 13, 2881-2886.
Li, X.; Wang, Y.; Wang, Q.H.; Kim, S.T.; Zhou, X. Copyright Protection for Holographic Video Using Spatiotemporal Consistent Embedding Strategy. IEEE Trans. Ind. Inform. 2019, 15, 6187-6197.
Choi, H.J.; Seo, Y.H.; Yoo, J.S.; Kim, D.W. An Electronic Watermarking Technique for Digital Holograms in a DWT Domain. In Advances in Image and Video Technology; Chang, L.W., Lie, W.N., Eds.; Springer: Berlin/Heidelberg, Germany, 2006; pp. 1007-1017.
Choi, H.J.; Seo, Y.H.; Yoo, J.S.; Kim, D.W. Digital watermarking technique for holography interference patterns in a transform domain. Opt. Lasers Eng. 2008, 46, 343-348.
Lee, Y.H.; Seo, Y.H.; Kim, D.W. Digital hologram watermarking by embedding Fresnel-diffracted watermark data. Opt. Eng. 2019, 58, 1-17.
Zhu, J.; Kaplan, R.; Johnson, J.; Fei-Fei, L. HiDDeN: Hiding Data With Deep Networks. In Proceedings of the European Conference on Computer Vision (ECCV), Amsterdam, The Netherlands, Oct. 8-16, 2018; pp. 657-672.
Ahmadi, M.; Norouzi, A.; Karimi, N.; Samavi, S.; Emami, A. ReDMark: Framework for residual diffusion watermarking based on deep networks. Expert Syst. Appl. 2020, 146, 113157.
Lee, J.E.; Seo, Y.H.; Kim, D.W. Convolutional Neural Network-Based Digital Image Watermarking Adaptive to the Resolution of Image and Watermark. Appl. Sci. 2020, 10, 6854.
Deeba, F.; Kun, S.; Dharejo, F.A.; Langah, H.; Memon, H. Digital Watermarking Using Deep Neural Network. Int. J. Mach. Learn. Comput. 2020, 10, 277-282.
A. Pinheiro et al., "Definition of Common Test Conditions for the new JPEG Pleno holography standard", Optics Photonics and Digital Technologies for Imaging Applications VII, 2022.
R. Muhamad et al., "JPEG Pleno holography: scope and technology validation procedures", Appl. Opt., vol. 60, No. 3, pp. 641-651, Jan. 2021.
T. Birnbaum et al., "A standard way for computing numerical re-constructions of digital holograms", Optics Photonics and Digital Technologies for Imaging Applications VII, 2022.
M. Bernardo et al., "Holographic representation: Hologram plane vs. object plane", Signal Processing: Image Communication, vol. 68, pp. 193-206, 2018.
Efficient coding of experimental holograms using speckle denoising, Signal Processing: Image Communication, vol. 96, pp. 116306, 2021.
Zhong, X.; Huang, P.C.; Mastorakis, S.; Shih, F.Y. An Automated and Robust Image Watermarking Scheme Based on Deep Neural Networks. IEEE Trans. Multimed. 2021, 23, 1951-1961.
Liu, Y.; Guo, M.; Zhang, J.; Zhu, Y.; Xie, X. A Novel Two-Stage Separable Deep Learning Framework for Practical Blind Watermarking. In Proceedings of the 27th ACM International Conference on Multimedia, Nice, France, Oct. 21-25, 2019; Association for Computing Machinery: New York, NY, USA, 2019; pp. 1509-1517.
Y. Uchida, Y. Nagai, S. Sakazawa and S. Satoh, "Embedding watermarks into deep neural networks", Proceedings of the ACM on International Conference on Multimedia Retrieval, 2017.
Y. Nagai, Y. Uchida, S. Sakazawa and S. Satoh, "Digital watermarking for deep neural networks", International Journal of Multimedia Information Retrieval, vol. 7, No. 1, 2018.
K. Simonyan and A. Zisserman, "Very deep convolutional networks for large-scale image recognition", Proc. of ICLR, 2015.
Erwan Le Merrer, Patrick Perez, Gilles Tredan, "Adversarial Frontier Stitching for Remote Neural Network Watermarking", Neural Computing & Applications, vol. 62, No. 12, 2017.
Z. Hu, K. She, J. Wang and J. Tang, "Game theory based false negative probability of embedded watermark under unintentional and steganalysis attacks", China Communications, vol. 11, No. 5, pp. 114-123, 2014.
Kang, Ji-Won, Jae-Eun Lee, Jang-Hwan Choi, Woosuk Kim, Jin-Kyum Kim, Dong-Wook Kim, and Young-Ho Seo. 2021. "Digital Hologram Watermarking Based on Multiple Deep Neural Networks Training Reconstruction and Attack" Sensors 21, No. 15: 4977. https://doi.org/10.3390/s21154977.

\* cited by examiner

| Attack type | Attack | Strength |
|---|---|---|
| No attack | Identity | - |
| Pixel-value change attack | Gaussian filtering | 3×3, 5×5, 7×7, 9×9 |
| | Average filtering | 3×3, 5×5 |
| | Median filtering | 3×3, 5×5 |
| | Salt & Pepper | p = 0.04, 0.06 |
| | Gaussian noise | Sigma = 0.04, 0.06 |
| | Sharpening | 5-point stencil, 9-point stencil |
| | JPEG | Quality factor =40, 60 |
| Geometric attack | Rotation | 0~ 90° (random) |
| | Cropout | 0.1, 0.2 |

ROBUST HOLOGRAM WATERMARKING SYSTEM BASED ON ARTIFICIAL INTELLIGENCE

BACKGROUND OF THE INVENTION

1. Field of the Invention

The present invention relates to a robust hologram watermarking system based on artificial intelligence, which is a blind hologram watermarking network using deep learning, in which an attack simulation is added before an operation of a hologram resolution adjustment network so that training is performed to exhibit a feature that is more robust against an attack.

2. Description of the Related Art

In general, a hologram is a recording of a fringe pattern generated by interference between a reference wave serving as a reference and an object wave reflected on an object. The hologram may include two-dimensional (2D) data (a real number and an imaginary number, or a magnitude and a phase) of a complex plane, so that the hologram may include three-dimensional (3D) image information. A digital hologram may be obtained by a digital photographing device from an analog hologram generated by an interference phenomenon by an optical element, or may be generated by sampling a photographed analog hologram. Recently, however, the digital hologram is generated by mathematically modeling and calculating interference between two waves and using deep learning.

Recently, application fields of digital holograms are expanding due to digital hologram compression standardization activities of JPEG Pleno, development of hologram printers, and emergence of various hologram displays. As digital hologram contents develop, an interest in security of digital holograms is also increasing. Until now, many digital hologram watermarking methods based on algorithms have been studied.

Javidi et al. proposed a method for enhancing security by generating a 3D object host image and a watermark as holograms, embedding the watermark in the host image, and performing dual phase encoding (Non-patent Document 1). Kim et al. proposed a method for finding an optimal watermark embedding strength to minimize a mean square error (MSE) between a reconstruction image and an original image (Non-patent Document 2). Zhou et al. proposed a method for embedding a watermark by finding a spatiotemporal edge by using both spatial continuity and temporal continuity for a hologram image (Non-patent Document 3).

Until now, the research team of the present inventor proposed several hologram watermarking techniques. The first method is a method for converting a hologram into a frequency domain by using a discrete wavelet transform having a Mallat-tree subband structure, and replacing a bit plane of a specific subband with watermark data in a wavelet domain (Non-patent Document 4). The second method is a method for applying a block-based discrete cosine transform to a hologram, and extracting an edge map to find a position to embed a watermark (Non-patent Document 5). In addition, the third method is a method for forming a hologram into a two-dimensional diffraction pattern by using characteristics of a Fresnel transform, and embedding a watermark by using a property that the Fresnel transform and a traveling wave converge (Non-patent Document 6).

Meanwhile, an artificial intelligence technology using deep learning has been widely used in all fields. Likewise, researches using deep learning are increasing in the digital watermarking field. A deep learning-based technology shows excellent performance even in digital watermarking of 2D images.

Zhu et al. proposed a method for globally embedding a watermark by duplicating one-dimensional (1D) watermark data in 3D (Non-patent Document 7). This method is configured by using an encoder network for embedding a watermark, a decoder network for extracting the watermark from a watermark image that has passed through an attack layer, and an adversarial network for steganography analysis. Ahmadi et al. proposed a method for transforming an original image into a frequency domain by using a DCT transform network that has already been trained, and embedding watermark data into the frequency domain (Non-patent Document 8). In this method, circular convolution is performed to globally distribute the watermark data. In addition, the research team of the present inventor proposed a method for embedding a watermark by enlarging watermark data to a resolution of an original image instead of lowering the resolution of the original image to a resolution of the watermark data (Non-patent Document 9). Deeba et al. proposed a neural network that may include a watermark. This network does not include a network for an attack and extraction (Non-patent Document 10). Y. chida (Non-patent Document 11) and Nagai (Non-patent Document 12) proposed a watermarking approach for inserting intellectual property information into a weight matrix of a convolutional neural network. Since a static property (weight) of a model is used instead of a dynamic content, a capacity of a watermark that is generated may be limited. This method may lose a portion of watermark information after pruning and migration training. Erwan et al. proposed a zero-bit watermarking algorithm. Unlike most algorithms, this algorithm may perform a remote query to extract a watermark, and performance of a deep learning model is not significantly degraded even when the algorithm adds the watermark (Non-patent Document 13). Kang et al. (Non-patent Document 14) proposed a general watermarking network for a resolution converting network, a watermark input network, and a watermark extracting network, in which training is performed to include quality of a reconstructed hologram so as to improve invisibility.

DOCUMENTS OF RELATED ART

Non-Patent Documents (Non-patent Document 1) Kishk, S.; Javidi, B. 3D object watermarking by a 3D hidden object. Opt. Express 2003, 11, 874-888

(Non-patent Document 2) Kim, H.; Lee, Y. H. Optimal watermarking of digital hologram of 3-D object. Opt. Express 2005, 13, 2881-2886.

(Non-patent Document 3) Li, X.; Wang, Y.; Wang, Q. H.; Kim, S. T.; Zhou, X. Copyright Protection for Holographic Video Using Spatiotemporal Consistent Embedding Strategy. IEEE Trans. Ind. Inform. 2019, 15, 6187-6197.

(Non-patent Document 4) Choi, H. J.; Seo, Y. H.; Yoo, J. S.; Kim, D. W. An Electronic Watermarking Technique for Digital Holograms in a DWT Domain. In Advances in Image and Video Technology; Chang, L. W., Lie, W. N., Eds.; Springer: Berlin/Heidelberg, Germany, 2006; pp. 1007-1017.

(Non-patent Document 5) Choi, H. J.; Seo, Y. H.; Yoo, J. S.; Kim, D. W. Digital watermarking technique for holography interference patterns in a transform domain. Opt. Lasers Eng. 2008, 46, 343-348.

(Non-patent Document 6) Lee, Y. H.; Seo, Y. H.; Kim, D. W. Digital hologram watermarking by embedding Fresnel-diffracted watermark data. Opt. Eng. 2019, 58, 1-17.

(Non-patent Document 7) Zhu, J.; Kaplan, R.; Johnson, J.; Fei-Fei, L. HiDDeN: Hiding Data With Deep Networks. In Proceedings of the European Conference on Computer Vision (ECCV), Amsterdam, The Netherlands, 8-16 Oct. 2018; pp. 657-672.

(Non-patent Document 8) Ahmadi, M.; Norouzi, A.; Karimi, N.; Samavi, S.; Emami, A. ReDMark: Framework for residual diffusion watermarking based on deep networks. Expert Syst. Appl. 2020, 146, 113157.

(Non-patent Document 9) Lee, J. E.; Seo, Y. H.; Kim, D. W. Convolutional Neural Network-Based Digital Image Watermarking Adaptive to the Resolution of Image and Watermark. Appl. Sci. 2020, 10, 6854.

(Non-patent Document 10) Deeba, F.; Kun, S.; Dharejo, F. A.; Langah, H.; Memon, H. Digital Watermarking Using Deep Neural Network. Int. J. Mach. Learn. Comput. 2020, 10, 277-282.

(Non-patent Document 11) Y. Uchida, Y. Nagai, S. Sakazawa and S. Satoh, "Embedding watermarks into deep neural networks", Proceedings of the ACM on International Conference on Multimedia Retrieval, 2017.

(Non-patent Document 12) Y. Nagai, Y. Uchida, S. Sakazawa and S. Satoh, "Digital watermarking for deep neural networks", International Journal of Multimedia Information Retrieval, vol. 7, no. 1, 2018.

(Non-patent Document 13) Erwan Le Merrer, Patrick Perez, Gilles Tredan, "Adversarial Frontier Stitching for Remote Neural Network Watermarking", Neural Computing & Applications, vol. 62, no. 12, 2017.

(Non-patent Document 14) Kang, Ji-Won, Jae-Eun Lee, Jang-Hwan Choi, Woosuk Kim, Jin-Kyum Kim, Dong-Wook Kim, and Young-Ho Seo. 2021. "Digital Hologram Watermarking Based on Multiple Deep Neural Networks Training Reconstruction and Attack" Sensors 21, no. 15: 4977. https://doi.org/10.3390/s21154977

SUMMARY OF THE INVENTION

To solve the problems described above, an object of the present invention is to provide a robust hologram watermarking system based on artificial intelligence, which is a blind hologram watermarking network using deep learning, in which an attack simulation is added before an operation of a hologram resolution adjustment network so that training is performed to exhibit a feature that is more robust against an attack.

In particular, an object of the present invention is to provide a robust hologram watermarking system based on artificial intelligence, capable of extracting a watermark with consistency even against various attacks by adjusting an attack rate of an attack simulation according to training.

In addition, an object of the present invention is to provide a robust hologram watermarking system based on artificial intelligence, capable of improving robustness against an attack by adding quality of a distance between a real part and an imaginary part in a complex space to a loss function to perform training.

To achieve the objects described above, according to the present invention, there is provided a robust hologram watermarking system based on artificial intelligence, the robust hologram watermarking system including: an attack invariant module for attacking an original hologram; a robust feature extracting network (RFEN) for receiving an output of the attack invariant module and outputting a feature map (hereinafter referred to as an "original hologram feature map"); a resolution converting network (RCN) for receiving an original watermark and outputting a feature map having a same resolution as the original hologram (hereinafter referred to as a "watermark feature map"); a channel concatenator for concatenating the original hologram feature map and the watermark feature map; a watermark embedding network (WMN) for receiving an output of the channel concatenator and outputting a hologram in which a watermark is embedded (hereinafter referred to as a "watermarked hologram"); an attack simulator for attacking the watermarked hologram; a watermark extracting network (WXN) for receiving an output of the attack simulator and outputting a watermark (hereinafter referred to as an "extracted watermark"); and a training unit for training neural networks of the robust feature extracting network, the resolution converting network, the watermark embedding network, and the watermark extracting network by using a loss function, wherein the robust feature extracting network, the resolution converting network, the watermark embedding network, and the watermark extracting network include the neural networks.

In addition, according to the present invention, in the robust hologram watermarking system based on the artificial intelligence, the attack invariant module may generate an attacked hologram by attacking the original hologram, and may concatenate and output the attacked hologram and the original hologram.

In addition, according to the present invention, in the robust hologram watermarking system based on the artificial intelligence, the attack invariant module may attack in a same manner as the attack simulator.

In addition, according to the present invention, in the robust hologram watermarking system based on the artificial intelligence, the attack simulator may attack the hologram by allocating a plurality of types of attacks in an attack batch and simulating an attack by using the attack batch.

In addition, according to the present invention, in the robust hologram watermarking system based on the artificial intelligence, the attack simulator may adjust an attack rate of each of the types of the attacks to simulate the attack using the attack batch.

In addition, according to the present invention, in the robust hologram watermarking system based on the artificial intelligence, an unattacked case may be set as one attack type, and an unattacked type may be included in the attack batch.

In addition, according to the present invention, in the robust hologram watermarking system based on the artificial intelligence, the training unit may perform the training by using a loss between the original watermark and the extracted watermark as a first loss function, using a loss between an amplitude of the original hologram and an amplitude of the watermarked hologram as a second loss function, using a loss between a Frobenius norm of the original hologram and a Frobenius norm of the watermarked hologram as a third loss function, and using a loss between a reconstruction result of the original hologram and a reconstruction result of the watermarked hologram as a fourth loss function.

In addition, according to the present invention, in the robust hologram watermarking system based on the artificial intelligence, the training unit may obtain a fifth loss function by multiplying the first loss function by a weight, train the neural network of the watermark extracting network by using the fifth loss function, obtain a sixth loss function by weighted-summing the first to fourth loss functions, and train the neural networks of the robust feature extracting network, the resolution converting network, and the watermark embedding network by using the sixth loss function.

In addition, according to the present invention, in the robust hologram watermarking system based on the artificial intelligence, when a resolution of a hologram is M×N, and a resolution of a watermark is X×Y, the first to fourth loss functions, which are Loss1, Loss2, Loss3, Loss4, are obtained by Mathematical Formulas 1 to 4:

$$Loss1 = \frac{1}{XY}\sum_{i=0}^{X-1}\sum_{j=0}^{Y-1}|WM_{ori}(i,j) - WM_{ext}(i,j)|$$ [Mathematical Formula 1]

where $WM_{ori}(i,j)$ and $WM_{ext}(i,j)$ are an original watermark and an extracted watermark, respectively;

$$Loss2 = \frac{1}{MN}\sum_{i=0}^{M-1}\sum_{j=0}^{N-1}[H_{am,ori}(i,j) - H_{am,wm}(i,j)]^2$$ [Mathematical Formula 2]

where $H_{am,ori}(i,j)$ and $H_{am,wm}(i,j)$ are amplitudes of an original hologram and a watermarked hologram, respectively;

$$Loss3 = 10\log_{10}\left(\frac{\|H_{ori}\|_F}{\|H_{ori} - H_{wm}\|_F}\right)$$ [Mathematical Formula 3]

$$\|H\|_F = \sqrt{\sum_{i,j}^{M,N}\left(Re_{i,j}^2 + Im_{i,j}^2\right)}$$

where $H_{ori}$ and $H_{wm}$ are Frobenius norms of an original hologram and a watermarked hologram, respectively; and $$Loss4 = \frac{1}{MN}\sum_{i=0}^{M-1}\sum_{j=0}^{N-1}[R_{ori}(i,j) - R_{wmk}(i,j)]^2$$ [Mathematical Formula 4]

where $R_{ori}(i,j)$ and $R_{wmk}(i,j)$ are reconstruction results of an original hologram and a watermarked hologram, respectively.

In addition, according to the present invention, in the robust hologram watermarking system based on the artificial intelligence, the system may further include an attack rate adjustment unit for adjusting an attack rate of each attack type of the attack simulator according to a loss of a training result by the training unit.

In addition, according to the present invention, in the robust hologram watermarking system based on the artificial intelligence, the attack rate adjustment unit may adjust the attack rate according to a first loss function, which is a loss between the original watermark and the extracted watermark.

As described above, according to the robust hologram watermarking system based on the artificial intelligence of the present invention, a hologram may be watermarked by using deep learning, and training may be performed by adding an attack simulation in a training process and adding quality of a distance between a real part and an imaginary part in a complex space to a loss function, so that watermarking can be more robust against an attack.

In addition, according to the robust hologram watermarking system based on the artificial intelligence of the present invention, an attack rate of the attack simulation may be adjusted according to the training, so that a watermark can be extracted with consistency even against various attacks.

DETAILED DESCRIPTION OF THE INVENTION

Figure 1:
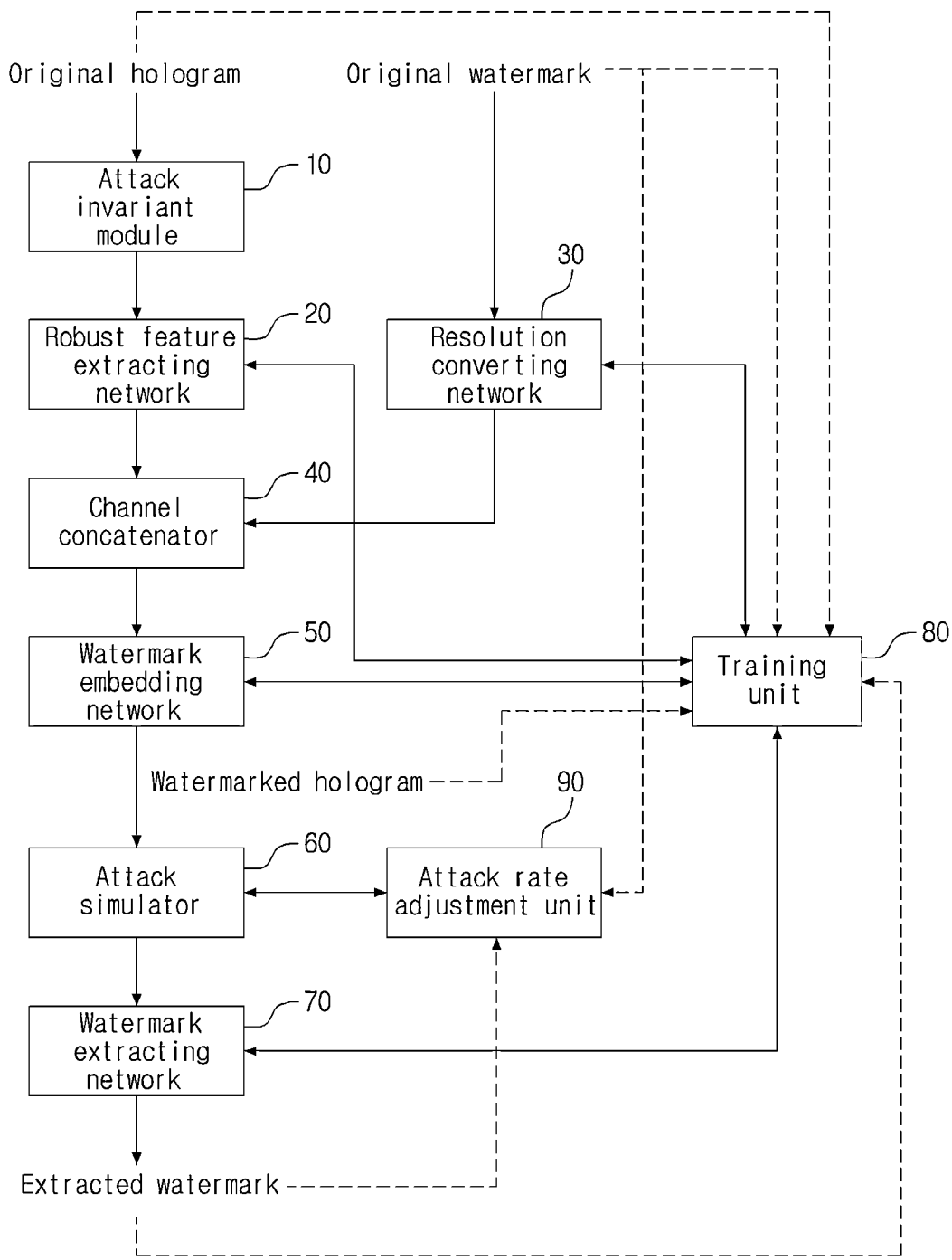
FIG. 1 is a block diagram showing a configuration of a robust hologram watermarking system based on artificial intelligence according to a first embodiment of the present invention.

Hereinafter, specific details for implementing the present invention will be described with reference to the drawings.

In addition, while describing the present invention, the same parts will be given the same reference numerals, and redundant descriptions thereof will be omitted.

First, a configuration of a robust hologram watermarking system based on artificial intelligence according to a first embodiment of the present invention will be described with reference to FIGS. 1 to 11.

As shown in FIG. 1, according to the first embodiment of the present invention, the robust hologram watermarking system based on the artificial intelligence may include four networks, which are a robust feature extracting network (RFEN) 20, a resolution converting network (RCN) 30, a watermark embedding network (WMN) 50, and a watermark extracting network (WXN) 70. In addition, all networks may use 3×3 convolution (CNN layer).

Additionally, the robust hologram watermarking system based on the artificial intelligence may further include a training unit 80 for training the above networks. In addition, the robust hologram watermarking system based on the artificial intelligence may further include: an attack invariant module 10 for attacking an original hologram that is input, and outputting an attacked hologram and the original hologram together with each other; a channel concatenator 40 for inputting an hologram, a watermark, and the like together with each other; an attack simulator 60 for attacking a watermarked hologram; and an attack rate adjustment unit 90 for adaptively adjusting an attack rate.

Meanwhile, preferably, data of a phase hologram may be normalized to [−1, 1]. In addition, a watermark may be configured as 1 or −1 in a binary format.

First, the attack invariant module 10 will be described.

Figure 2:
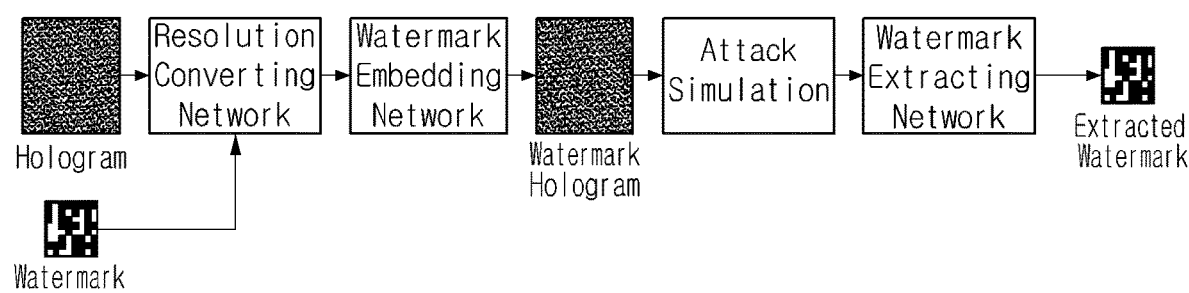
FIG. 2 is a block diagram showing a structure of a basic deep learning network for watermarking according to the related art.

As shown in FIG. 2, the present inventor proposed a network for embedding a watermark in a hologram (Non-patent Document 14). According to this research, invisibility of an amplitude hologram is higher than invisibility of a hologram embedded into a real part and an imaginary part. However, robustness does not exhibit a high bit error rate as compared with the real part and the imaginary part against all attacks. Therefore, the present invention may be intended to ensure robustness against various attacks while maintaining invisibility.

A first scheme for ensuring robustness against an attack may use the attack invariant module 10. As described above, an attack on a hologram may be included in a training process to add robustness to a watermarking scheme.

In this case, the present invention may be different from direct input of a hologram to a network as shown in FIG. 2. According to the present invention, an attack simulation may be applied after a watermark is embedded, and the same attack simulation may be applied when the hologram is input. A conventional scheme may simply extract only a feature of a hologram through the RCN 30, and add a feature of a watermark to the feature of the hologram. However, according to the present invention, training may be performed in consideration of both a hologram that has been attacked and an original hologram, resulting in more robustness against attacks.

Figure 3:
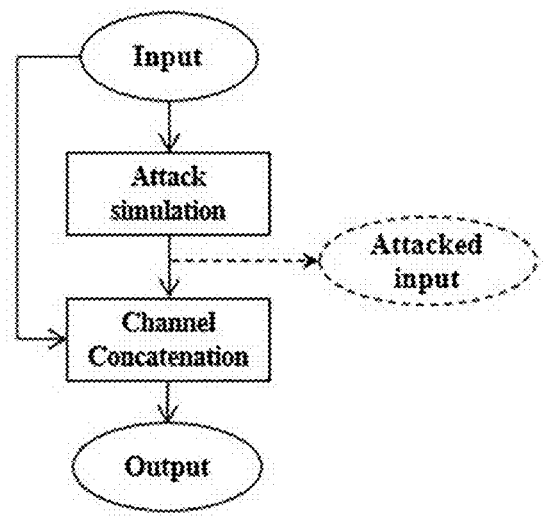
FIG. 3 is a view showing an operation process of an attack invariant module according to the first embodiment of the present invention.

FIG. 3 shows an operation process of the attack invariant module 10. An input hologram may be input in a unit of a batch, and the attack simulation may be applied in a unit of a batch. Thereafter, the hologram that has been attacked may exist, and the input hologram and the hologram that has been attacked may be combined (or concatenated) with each other and output. In addition, the output may be input to an input of the network.

The attack invariant module 10 may or may not attack in the same manner as the attack simulator 60 for attacking the watermarked hologram. Preferably, the attack invariant module 10 may attack in the same manner as the attack simulator 60 for attacking the watermarked hologram. In other words, when the attack invariant module 10 attacks in the same manner as the attack simulator 60, better performance may be exhibited.

Next, the robust feature extracting network (RFEN) 20 will be described.

The robust feature extracting network may extract features (feature maps) of an original host hologram and the hologram that has been attacked. In this case, a resolution of a channel may be constantly maintained, and the hologram may be expanded to 64 channels. In addition, as an experiment (training) is repeatedly performed, features having robust characteristics against attacks may be extracted.

Figure 4:
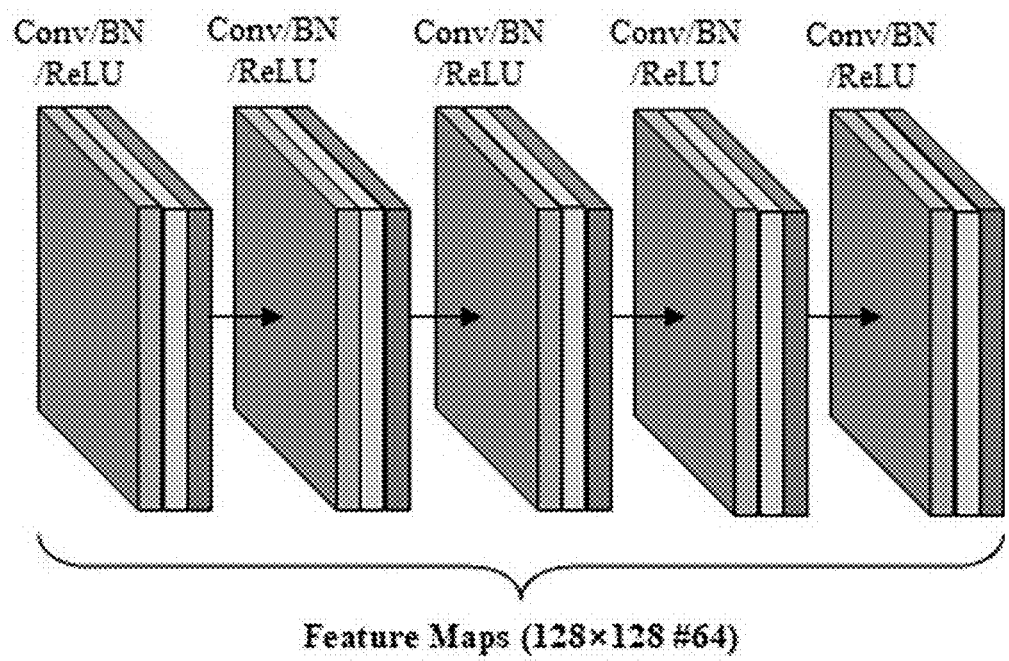
FIG. 4 is a view showing a structure of a robust feature extracting network (RFEN) according to the first embodiment of the present invention.

As shown in FIG. 4, first five layers of the robust feature extracting network 20 may have a structure of convolution-batch normalization (BN)-ReLU activation function-average pooling (AP).

Next, the resolution converting network (RCN) 30 will be described.

The RCN 30 refers to a network for matching a resolution of the watermark with a resolution of the hologram so that the resolution of the watermark may be the same as the resolution of the hologram. In other words, the resolution converting network 30 may output a feature map of the watermark, which has a resolution that is the same as the resolution of the hologram.

Figure 5:
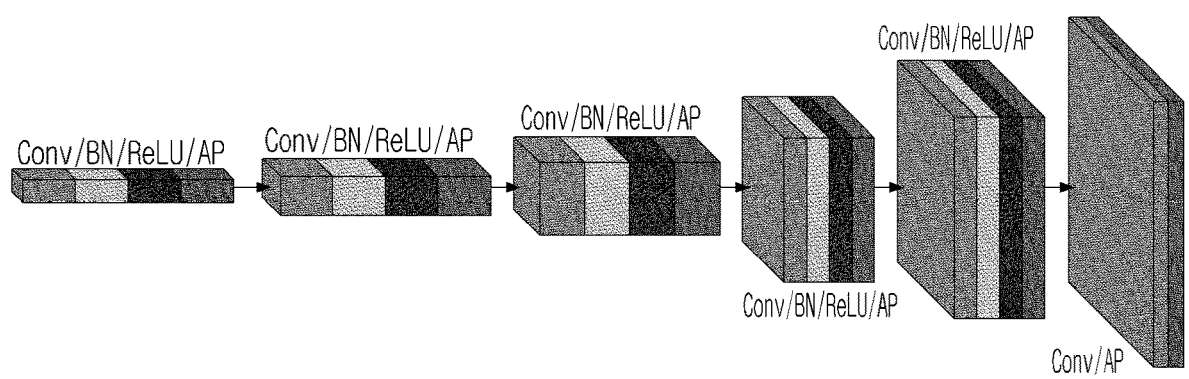
FIG. 5 is a view showing a structure of a resolution converting network (RCN) according to the first embodiment of the present invention.

As shown in FIG. 5, first five layers of the RCN 30 may have a structure of convolution-batch normalization (BN)-ReLU activation function-average pooling (AP), and a last layer of the RCN 30 may have a structure of CONV-AP. After multiplying an output of the last layer by a strength factor, the feature map may be output. In this case, the strength factor may be determined through an experiment.

Next, the channel concatenator 40 may concatenate feature maps of the hologram and the watermark having the same resolution to form a channel of the WMN 50. In other words, the feature map output from the RCN 30 may be concatenated with the feature map of the hologram output from the RFEN 20 into one channel so as to be input to the network (WMN).

In particular, the watermark embedding network 50 may receive a portion of the hologram that has been attacked and a portion of the hologram that has not been attacked as inputs. Therefore, the watermark may be embedded in consideration of the attack during the training.

Next, the watermark embedding network (WMN) 50 will be described.

Figures 6, 7:
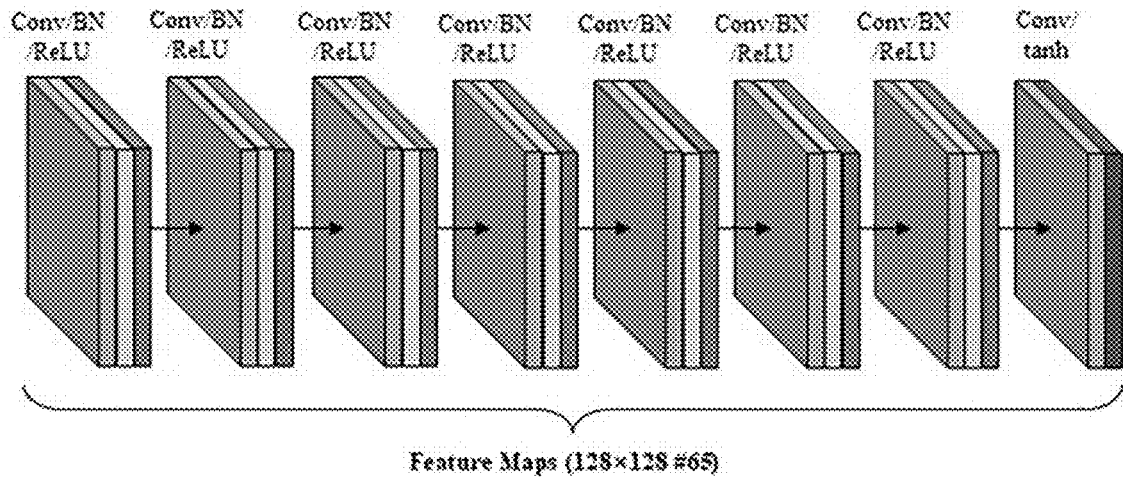
FIG. 6 is a view showing a structure of a watermark embedding network (WMN) according to the first embodiment of the present invention.
FIG. 7 is a table showing an attack type and a strength of an attack simulator according to the first embodiment of the present invention.

As shown in FIG. 6, the WMN 50 may include eight CNN blocks for maintaining a resolution of an input function map so that the resolution of the input function map may not be changed. The WMN 50 may include a total of eight CNN blocks, and may maintain the resolution of an input host hologram. The WMN 50 may not use pooling. Previous layers of the WMN 50 may be configured as convolution-batch normalization-ReLU (CONV-BN-ReLU), and a last layer of the WMN may be configured as CONV-tanh. A hyperbolic tangent (tanh) may be used as an activation function in the last layer so that the output may be normalized to a range of [−1, 1] so as to be identical to host data.

Next, the attack simulator 60 will be described.

For high robustness, the hologram in which the watermark is embedded may be subject to a preset attack.

Preferably, as shown in FIG. 7, seven pixel-value change attacks and two geometric attacks may be provided. The pixel-change attack may include at least one of a Gaussian filtering attack, an average filtering attack, a median filtering attack, a salt & pepper attack, a Gaussian noise addition attack, a sharpening attack, and a JPEG compression attack. In addition, the geometric attack may include at least one of a rotation attack and a crop-out attack.

This may imply that both intentional and unintentional attacks occur when data is distributed (Non-patent Document 7 and Non-patent Document 8). The table in FIG. 7 shows a type and a strength of each attack used in one batch. An unattacked case (or an unattacked type) may be included in the batch.

Figure 8:
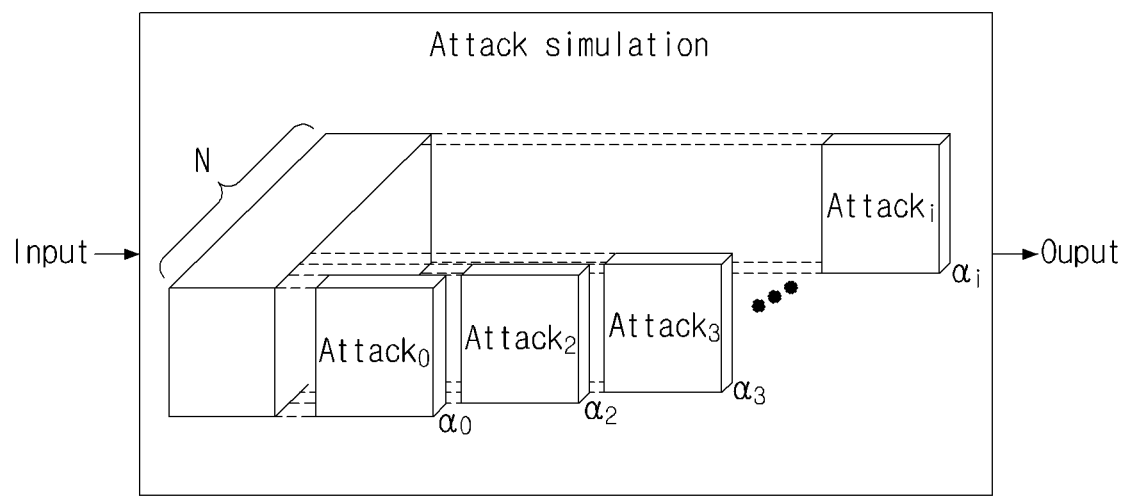
FIG. 8 is a view showing a structure of the attack simulator according to the first embodiment of the present invention.

In addition, as shown in FIG. 8, the attack simulator 60 may perform the attack by allocating various attacks (a plurality of types of attacks) in the batch. In other words, a batch size may be large to consider the various attacks when performing training from the watermark. In this way, the various attacks may be considered in one batch, and as a result, a watermark that is robust against various attacks without being overfitted to any one attack may be embedded.

In FIG. 8, N may represent one batch, $Attack_0$, $Attack_2$, $Attack_3$, . . . , and $Attack_i$ may be included in an attack batch, and the attack may be performed (the attack may be simulated).

In this case, all attacks (nine attacks+one unattacked case) may be included in one batch, or only some of the attacks may be included in one batch.

Meanwhile, since a batch indicates a plurality of holograms, one attack may be performed from a point of view of the hologram.

Next, the watermark extracting network (WXN) 70 will be described.

An input of the watermark extracting network (WXN) 70 may be a hologram obtained by attacking a watermarked hologram. The input hologram may be normalized similarly to the embedding process, and watermark information may be extracted from the normalized hologram. This result may be denormalized so as to be converted into binary numbers having only values of −1 and 1, so that a final watermark may be extracted.

Figure 9:
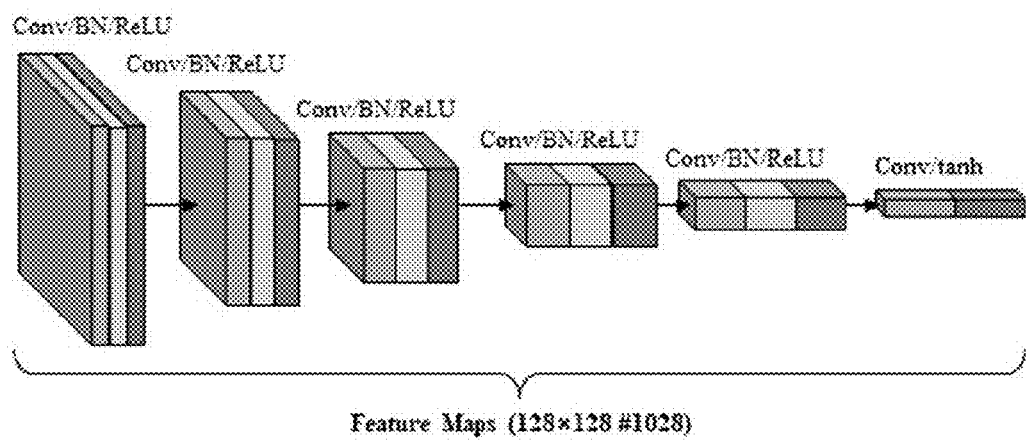
FIG. 9 is a view showing a structure of a watermark extracting network (WXN) according to the first embodiment of the present invention.
Figure 10:
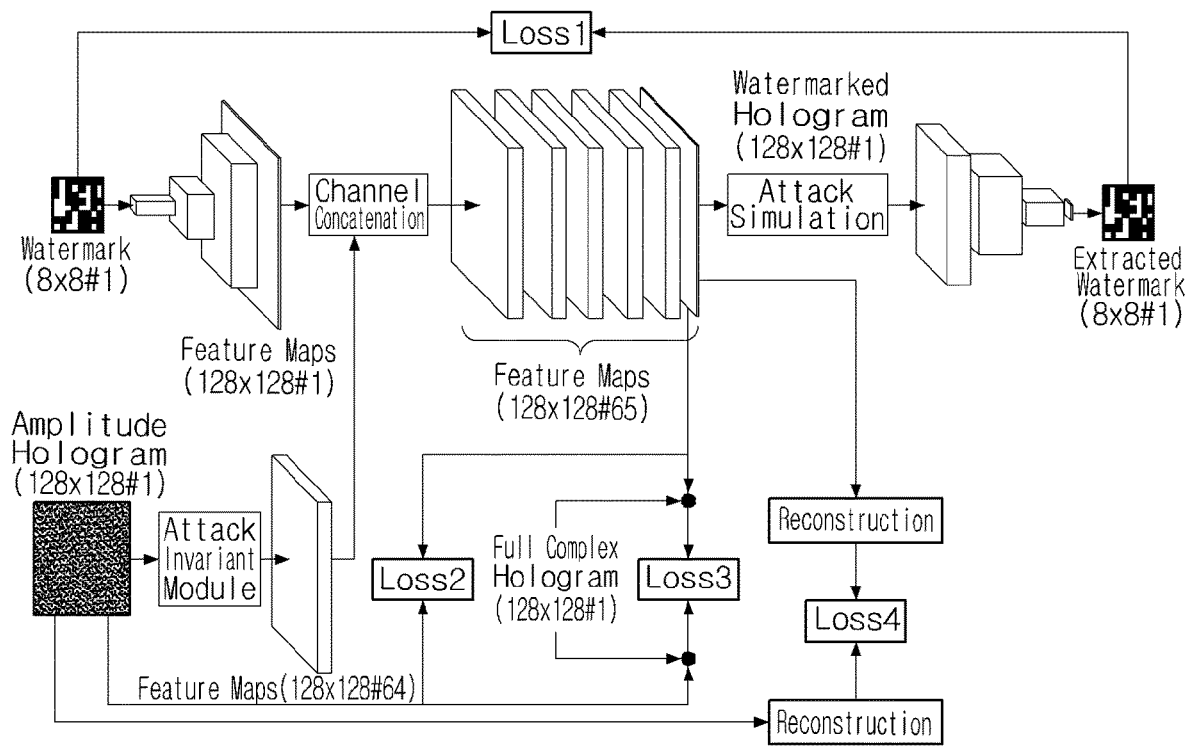
FIG. 10 is a view showing a training methodology of a watermarking network according to the first embodiment of the present invention.

As shown in FIG. 9, the WXN 70 may include six CNN layers, and the resolution of each layer is reduced so that the output of the last layer has the resolution of the watermark. First five layers of the WXN 70 may be configured as CONV-BN-ReLU, and a last layer of the WXN 70 may be configured as CONV-tanh so that the output may have a binary value of [−1, 1]. When a range of a result of the last layer is [0, 1], 1 may be allocated, and when the range is [−1, 0], −1 may be allocated.

Next, the training unit 80 will be described.

An attack simulation may be included in the training process to increase robustness of hologram watermarking. While a watermarking algorithm based on signal processing has a rule of analyzing and defending all expected attacks, watermarking based on deep learning may consider an attack during the training process.

In addition, as for the hologram, the host hologram may also be important. However, since a user observes reconstruction (restoration), not the hologram, the reconstruction of the hologram may be more important to invisibility. Therefore, the reconstruction of the hologram may be inserted into the training process.

In this case, according to the earlier researches, the training have been performed in consideration of a PSNR. However, since the hologram is a value that exists in a complex domain, it may be necessary to check a reconstructed result in consideration of a CSNR.

FIG. 9 shows a methodology for training a deep neural network for hologram watermarking.

First, a loss function will be described.

A loss function between an original watermark and an extracted watermark may be defined as a mean absolute error (MAE), and a loss function between an original amplitude hologram and an amplitude hologram in which a watermark is embedded may be defined as a mean square error (MSE). According to the present invention, the watermark may be binary data. In general, the MAE has high training efficiency when the training is performed using a watermark of binary data in a watermarking network (Non-patent Document 14).

A first loss function Loss1 is shown in Mathematical Formula 1, and a second loss function Loss2 is shown in Mathematical Formula 2. In this case, a resolution of an original hologram is M×N, and a resolution of a watermark is X×Y.

$$\text{Loss1} = \frac{1}{XY} \sum_{i=0}^{X-1} \sum_{j=0}^{Y-1} |WM_{ori}(i, j) - WM_{ext}(i, j)| \quad \text{[Mathematical Formula 1]}$$

In this case, $WM_{ori}(i,j)$ and $WM_{ext}(i,j)$ are an original watermark and an extracted watermark, respectively.

$$\text{Loss2} = \frac{1}{MN} \sum_{i=0}^{M-1} \sum_{j=0}^{N-1} [H_{am,ori}(i, j) - H_{am,wm}(i, j)]^2 \quad \text{[Mathematical Formula 2]}$$

In this case, $H_{am,ori}(i,j)$ and $H_{am,wm}(i,j)$ are amplitudes of an original hologram and a watermarked hologram, respectively.

In addition, a hologram may include 3D image information, and may be configured as two-dimensional data of a complex plane to express the 3D image information. In this case, the data may be generally expressed by a real number and an imaginary number, or an amplitude and a phase. When the watermark is embedded in the hologram, the watermark may be embedded in an amplitude part. However, the amplitude alone may not express the 3D image information, so that the amplitude and the phase necessarily have to be considered together. Accordingly, in order to consider three-dimensional information included in the hologram as well as MSEs for amplitudes of the hologram in which the watermark is embedded and the original hologram, an SNR [18] for a complex number in a hologram plane has to be included in the training.

A Frobenius norm of a full complex hologram, which is $\|H\|_F$, may be defined as in Mathematical Formula 3. A loss function between a complex plane hologram in which a watermark is embedded and an original complex plane hologram obtained by using the Frobenius norm may be Loss3, which is represented by Mathematical Formula 4. In this case, an SNR may be defined as a signal-to-noise ratio, and may be generally expressed on a logarithmic scale. The SNR may represent quality of the hologram. When the SNR is included in a loss, the training may be performed while maintaining the quality of the hologram. Accordingly, robustness against attacks and invisibility may be increased.

$$\|H\|_F = \sqrt{\sum_{i,j}^{M,N} (\text{Re}_{i,j}^2 + \text{Im}_{i,j}^2)} \quad \text{[Mathematical Formula 3]}$$

$$\text{Loss3} = 10 \log_{10}\left(\frac{\|H_{ori}\|_F}{\|H_{ori} - H_{wm}\|_F}\right) \quad \text{[Mathematical Formula 4]}$$

In this case, $H_{ori}$ and $H_{wm}$ are Frobenius norms of an original hologram and a watermarked hologram, respectively.

In addition, although the original hologram is important, the user may observe reconstructed information through interference and diffraction of the hologram, not the hologram. Therefore, it may be necessary to consider a result of the hologram reconstructed in the training process (Non-patent Document 14). In a case of 2D or 3D image watermarking, which is not a hologram, the watermark may be embedded in a region observed by the user. However, since the hologram of the domain in which the embedding is performed is different from the reconstructed hologram of the domain in which the hologram is observed, invisibility evaluation has to be performed in both of the domains. Therefore, according to the present invention, three-dimensional quality of the hologram may be considered by reflecting a reconstruction result to the training.

Therefore, a loss function (or a fourth loss function Loss4) between the reconstructed original hologram and a result of reconstructing the hologram in which the watermark is embedded may be defined as an MSE. The fourth loss function Loss4 may be represented by Mathematical Formula 5.

$$\text{Loss4} = \frac{1}{MN} \sum_{i=0}^{M-1} \sum_{j=0}^{N-1} [R_{ori}(i, j) - R_{wmk}(i, j)]^2 \quad \text{[Mathematical Formula 5]}$$

In this case, $R_{ori}(i,j)$ and $R_{wmk}(i,j)$ are reconstruction results of an original hologram and a watermarked hologram, respectively.

In general, the invisibility of the embedded watermark and the robustness may be in a trade-off relation. In other words, when the watermark is embedded with a low strength, the invisibility may be increased while the robustness may be decreased. On the contrary, when the watermark is embedded with a strong strength, the invisibility may be decreased while the robustness may be increased. However, a watermark algorithm may simultaneously pursue both the invisibility and the robustness without choosing only one of the invisibility and the robustness.

Therefore, the two properties may not be separated, so that according to the present invention, a loss function L1 (or a fifth loss function) of the watermark extracting network 70 may be defined as in Mathematical Formula 6, and a loss function L2 (or a sixth loss function) of a network except for the watermark extracting network 70 may be defined as in Mathematical Formula 7.

$$L1 = \omega_0 \text{Loss1} \quad \text{[Mathematical Formula 6]}$$

$$L2 = \omega_1 \text{Loss1} + \omega_2 \text{Loss2} + \omega_3 \text{Loss3} + \omega_4 \text{Loss4} \quad \text{[Mathematical Formula 7]}$$

In Mathematical Formulas 6 and 7, $w_0$ to $w_4$ may be determined as hyper-parameters by an experiment.

Next, the attack rate adjustment unit 90 will be described.

The attack simulation may be inserted inside the watermarking network for robustness of the watermark. Many earlier researches have pursued enhancement of watermark extraction even when various attacks are performed on an image or a hologram (Non-patent Documents 11, 12, 13, and 14). Kang et al. (Non-patent Document 14) have improved robustness performance of a network by analyzing an robustness result of a watermark, and manually adjusting a hyper-parameter that determines a rate of an attack within a batch in an attack simulation.

According to the present invention, an operation of recognizing an inference result of the network and retraining an attack at which weak robustness is obtained may be performed to perform the training by automatically modifying a parameter inside the network. In this way, an adaptive attack rate control (AARC) scheme for adjusting a rate of an attack performed on an input tensor may be used when next training is performed based on the robustness result.

Figure 11:
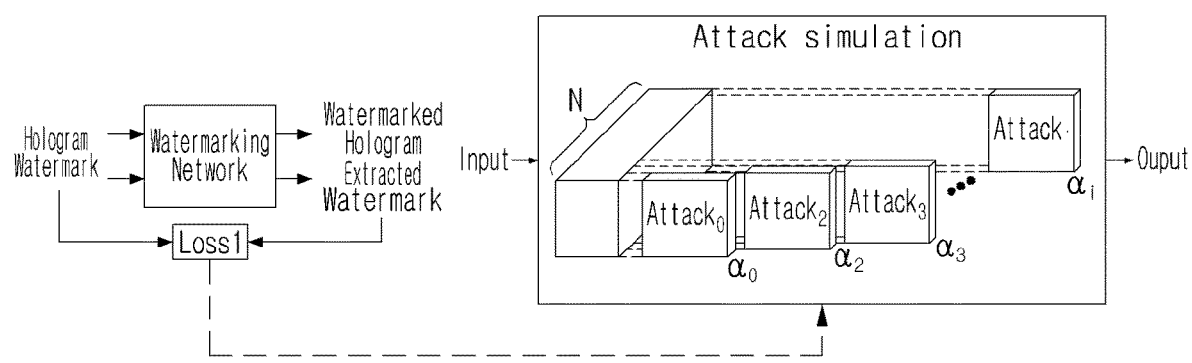
FIG. 11 is a view showing an adjustment operation of an attack rate adjustment unit according to the first embodiment of the present invention.

According to the present invention, the AARC may aim to improve overall performance against attacks without separately adjusting the hyper-parameter. FIG. 11 shows a structure of an attack simulation to which AARC is applied. An input of the attack simulation may be the input hologram or the hologram in which the watermark is embedded. An output of the attack simulation may be an input hologram that has been attacked or the hologram in which the watermark is embedded that has been attacked.

In other words, the attack rate adjustment unit 90 may perform validation for each attack by using validation at every repetitions in the training process. In this case, a first loss Loss1, which is a robustness result for each attack, may be derived. The robustness result may be used to determine a rate of an attack against the batch. In FIG. 11, a rate of each attack for N batches for the input hologram may be determined as $[\alpha_1:\alpha_2:\alpha_3: \ldots \alpha_i]$, and the rate of each attack may be changed according to a verification result for the robustness. In other words, the attack rate adjustment unit 90 may continuously adjust the attack rate during the training process.

In addition, since a loss result varies depending on the attack, when the loss is too high for a specific attack upon the attack, the training may be continuously performed only to fit for the attack. To prevent this, it may be necessary to adjust a rate of an attack in a batch to match a result. The batch may be divided based on the rate according to the attack, and the loss may be checked when an entire batch is applied for each attack, so that a rate of an attack with a high loss may be increased to obtain a robust tendency against the attack. In addition, the rate may be adjusted while continuously checking the loss even for attacks with low losses, so that robustness against overall attacks, not just for one attack, may be obtained.

The training may be repeatedly performed in a unit of batch parallelization, and in a unit of one epoch when repetitions in which all data sets may be used one time are performed. In other words, a number of repetitions may be one epoch. A verification process for the training may be performed in a unit of epoch. In this case, when robustness for a specific attack is low, a rate of the attack may be adjusted to be high.

Meanwhile, this is not only for the first loss Loss1, so that all losses may be operated in the same way. The training may not use only one loss, and all losses may operate together. In addition, it may be impossible to identify how much one loss contributes to training of a specific function of the network.

Next, a configuration of a robust hologram watermarking system based on artificial intelligence according to a second embodiment of the present invention will be described with reference to FIG. 12.

The second embodiment of the present invention may be the same as the first embodiment described above. However, the second embodiment of the present invention may have a configuration of layers of each network, which is different from the configuration of the layers of each network according to the first embodiment. In the following, only a difference between the second embodiment and the first embodiment will be described, and the rest of the configuration will refer to the description of the first embodiment above.

In general, in a case of a basic network for watermarking based on DNN, a simple feature may be extracted by using one convolution layer. The present invention may be intended to improve robustness by using an attack invariant module 10, and it may be necessary to extract an appropriate feature for this purpose.

Figure 12:
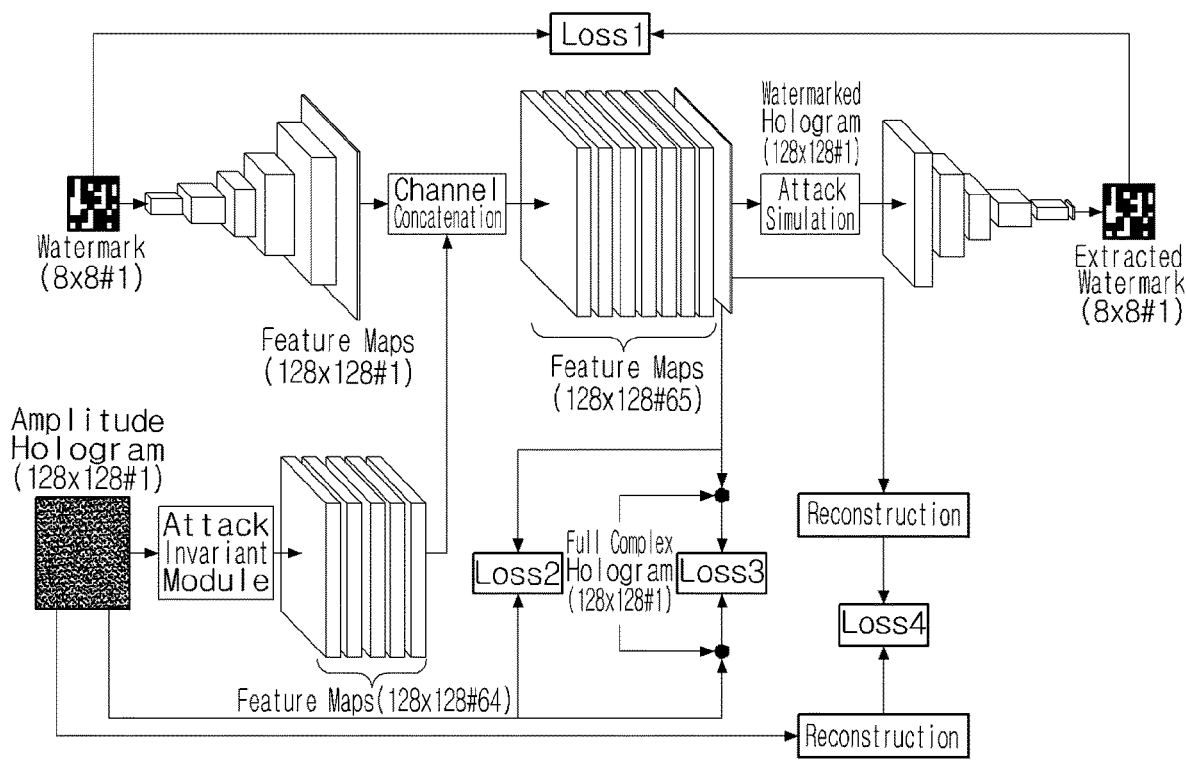
FIG. 12 is a view illustrating a configuration of a robust hologram watermarking system based on artificial intelligence according to a second embodiment of the present invention.

Therefore, as shown in FIG. 12, the robust feature extracting network 20 may extract the feature by using at least five layers, rather than extracting the feature by using one layer. In addition, a network except for the robust feature extracting network 20 may have at least two additional layers.

In other words, a depth of a deep learning network may improve performance of the watermarking.

Although the present invention invented by the present inventor has been described in detail according to the above embodiments, the present invention is not limited to the embodiments, and various modifications can be made without departing from the gist of the present invention.

What is claimed is:

1. A robust hologram watermarking system based on artificial intelligence, the robust hologram watermarking system comprising:
    an attack invariant module for attacking an original hologram;
    a robust feature extracting network (RFEN) for receiving an output of the attack invariant module and outputting an original hologram feature map;
    a resolution converting network (RCN) for receiving an original watermark and outputting a watermark feature map having a same resolution as the original hologram;
    a channel concatenator for concatenating the original hologram feature map and the watermark feature map;
    a watermark embedding network (WMN) for receiving an output of the channel concatenator and outputting a watermarked hologram in which a watermark is embedded;
    an attack simulator for attacking the watermarked hologram;
    a watermark extracting network (WXN) for receiving an output of the attack simulator and outputting an extracted watermark; and
    a training unit for training neural networks of the robust feature extracting network, the resolution converting network, the watermark embedding network, and the watermark extracting network by using a loss function,
    wherein the robust feature extracting network, the resolution converting network, the watermark embedding network, and the watermark extracting network include the neural networks,
    wherein the training unit performs the training by using a loss between the original watermark and the extracted watermark as a first loss function (Loss 1), a loss between an amplitude of the original hologram and an amplitude of the watermarked hologram as a second loss function (Loss 2), a loss between a Frobenius norm of the original hologram and a Frobenius norm of the watermarked hologram as a third loss function (Loss 3), and a loss between a reconstruction result of the original hologram and a reconstruction result of the watermarked hologram as a fourth loss function (Loss 4), and
    wherein the training unit obtains a fifth loss function by multiplying the first loss function by a weight, trains the neural networks of the watermark extracting network by using the fifth loss function, obtains a sixth loss function by weighted-summing the first to fourth loss functions, and trains the neural networks of the robust feature extracting network, the resolution converting network, and the watermark embedding network by using the sixth loss function.

2. The robust hologram watermarking system of claim 1, wherein the attack invariant module generates an attacked hologram by attacking the original hologram, and concatenates and outputs the attacked hologram and the original hologram.

3. The robust hologram watermarking system of claim 1, wherein the attack invariant module attacks in a same manner as the attack simulator.

4. The robust hologram watermarking system of claim 1, wherein the attack simulator attacks the hologram by allocating a plurality of types of attacks in an attack batch and simulating an attack by using the attack batch.

5. The robust hologram watermarking system of claim 4, wherein the attack simulator adjusts an attack rate of each of the plurality of types of attacks to simulate the attack using the attack batch.

6. The robust hologram watermarking system of claim 4, wherein an unattacked case is set as one attack type, and an unattacked type is included in the attack batch.

7. The robust hologram watermarking system of claim 1, further comprising an attack rate adjustment unit for adjusting an attack rate of an attack type of the attack simulator according to a loss of a training result by the training unit.

8. The robust hologram watermarking system of claim 7, wherein the attack rate adjustment unit adjusts the attack rate according to the first loss function.

9. A robust hologram watermarking system based on artificial intelligence, the robust hologram watermarking system comprising:
    an attack invariant module for attacking an original hologram;
    a robust feature extracting network (RFEN) for receiving an output of the attack invariant module and outputting an original hologram feature map;
    a resolution converting network (RCN) for receiving an original watermark and outputting a watermark feature map having a same resolution as the original hologram;
    a channel concatenator for concatenating the original hologram feature map and the watermark feature map;
    a watermark embedding network (WMN) for receiving an output of the channel concatenator and outputting a watermarked hologram in which a watermark is embedded;
    an attack simulator for attacking the watermarked hologram;
    a watermark extracting network (WXN) for receiving an output of the attack simulator and outputting an extracted watermark; and
    a training unit for training neural networks of the robust feature extracting network, the resolution converting network, the watermark embedding network, and the watermark extracting network by using a loss function,
    wherein the robust feature extracting network, the resolution converting network, the watermark embedding network, and the watermark extracting network include the neural networks,
    wherein the training unit performs the training by using a loss between the original watermark and the extracted watermark as a first loss function (Loss 1), a loss between an amplitude of the original hologram and an amplitude of the watermarked hologram as a second loss function (Loss 2), a loss between a Frobenius norm of the original hologram and a Frobenius norm of the watermarked hologram as a third loss function (Loss 3), and a loss between a reconstruction result of the original hologram and a reconstruction result of the watermarked hologram as a fourth loss function (Loss 4), and wherein, when a resolution of a hologram is M×N, and a resolution of a watermark is X×Y, the first to fourth loss functions, which are Loss1, Loss2, Loss3, and Loss4, are obtained by Mathematical Formulas 1 to 4:

$$\text{Loss1} = \frac{1}{XY} \sum_{i=0}^{X-1} \sum_{j=0}^{Y-1} |WM_{ori}(i, j) - WM_{ext}(i, j)|$$ [Mathematical Formula 1]

where $WM_{ori}(i,j)$ and $WM_{ext}(i,j)$ are the original watermark and the extracted watermark, respectively;

$$\text{Loss2} = \frac{1}{MN} \sum_{i=0}^{M-1} \sum_{j=0}^{N-1} [H_{am,ori}(i, j) - H_{am,wm}(i, j)]^2$$ [Mathematical Formula 2]

where $H_{am,ori}(i,j)$ and $H_{am,wm}(i,j)$ are the amplitudes of the original hologram and the watermarked hologram, respectively;

$$\text{Loss3} = 10 \text{Log}_{10}\left(\frac{\|H_{ori}\|_F}{\|H_{ori} - H_{wm}\|_F}\right)$$ [Mathematical Formula 3]

$$\|H\|_F = \sqrt{\sum_{i,j}^{M,N} (\text{Re}_{i,j}^2 + \text{Im}_{i,j}^2)}$$

where $H_{ori}$ and $H_{wm}$ are the Frobenius norms of the original hologram and the watermarked hologram, respectively; and $$\text{Loss4} = \frac{1}{MN} \sum_{i=0}^{M-1} \sum_{j=0}^{N-1} [R_{ori}(i, j) - R_{wmk}(i, j)]^2$$ [Mathematical Formula 4]

where $R_{ori}(i,j)$ and $R_{wmk}(i,j)$ are the reconstruction results of the original hologram and the watermarked hologram, respectively.

* * * * *